United States Patent [19]

Challier et al.

[11] 3,818,011

[45] June 18, 1974

[54] PIPERAZIN-1-YL CARBONYLOXY-ISOINDOLIN-1-ONES

[75] Inventors: Jean-Louis Challier, Thais; Claude Jenmart, Brunoy; Mayer Naoum Messer, Bievres; Pierre Simon, Montrouge, all of France

[73] Assignee: Rhone-Poulenc S. A., Paris, France

[22] Filed: Dec. 14, 1971

[21] Appl. No.: 207,979

[30] Foreign Application Priority Data
Dec. 14, 1970 France .............................. 70.44949

[52] U.S. Cl.....260/268 BC, 260/243 B, 260/247.7 H, 260/256, 260/268 C, 260/243.61, 260/326.1, 260/326.5 FM, 424/248;250;267;274
[51] Int. Cl............................................. C07d 51/70
[58] Field of Search........ 260/268 C, 268 BC, 326.1

[56] References Cited
UNITED STATES PATENTS

| | | | |
|---|---|---|---|
| 3,198,798 | 8/1965 | Zenitz | 260/268 BC |
| 3,436,402 | 4/1969 | Cassady | 260/268 C |
| 3,468,297 | 9/1969 | Sulkowski | 260/326.1 |
| 3,635,926 | 1/1972 | Shetty | 260/268 C |

*Primary Examiner*—Donald G. Daus
*Attorney, Agent, or Firm*—Stevens, Davis, Miller & Mosher

[57] ABSTRACT

Isoindolin-1-one derivatives with a phenyl or substituted phenyl radical on the 2-position nitrogen atom, optionally carrying on the benzene moiety of the heterocyclic radical substituents selected from halogen, alkyl and nitro, and a grouping —O—CO—$NR_1R_2$ on the 3-position carbon atom, $R_1$ being hydrogen or alkyl, $R_2$ being alkyl or dialkylaminoalkyl, or —$NR_1R_2$ in toto being a mononuclear heterocyclic group, preferably 4-alkylpiperazin-1-yl, possess useful pharmacological properties as tranquilisers and anti-convulsant agents.

5 Claims, No Drawings

PIPERAZIN-1-YL CARBONYLOXY-ISOINDOLIN-1-ONES

This invention relates to new therapeutically useful isoindoline derivatives, to processes for their preparation and pharmaceutical compositions containing them.

The new isoindoline derivatives of the present invention are those of the general formula:

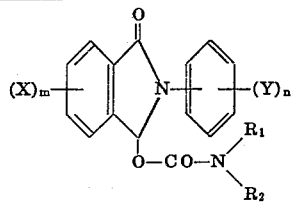

I (wherein X represents a halogen atom, an alkyl radical containing 1 to 4 carbon atoms, or a nitro radical, $m$ represents zero or an integer from 1 to 4, Y represents a halogen atom, an alkyl or alkoxy radical containing 1 to 4 carbon atoms, or a nitro or cyano radical, $n$ represents zero or an integer from 1 to 5, $R_1$ represents a hydrogen atom or an alkyl radical containing 1 to 4 carbon atoms, $R_2$ represents an alkyl radical containing 1 to 4 carbon atoms or a dialkylaminoalkyl group of which each alkyl radical contains 1 to 4 carbon atoms, or $R_1$ and $R_2$ together with the nitrogen atom to which they are attached collectively represent a 5- or 6-membered mononuclear heterocyclic group, which may contain a second hetero-atom selected from oxygen, sulphur and nitrogen, e.g. 1-pyrrolidinyl, piperidino, morpholino or 1-piperazinyl, and may carry as a substituent an alkyl or hydroxyalkyl radical containing 1 to 4 carbon atoms, preferably in the 4-position when the grouping —$NR_1R_2$ is 1-piperazinyl) and acid addition salts thereof. When symbol $m$ represents 2, 3 or 4, or symbol $n$ represents 2, 3, 4 or 5 it is to be understood that the atoms or radicals present on the isoindoline and phenyl nuclei may be the same or different.

According to a feature of the invention, the isoindoline derivatives of general formula I are prepared by the process which comprises reacting a chloroformamide of the general formula:

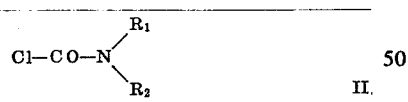

II.

(wherein $R_1$ and $R_2$ are as hereinbefore defined) with an alkali metal salt, optionally prepared in situ, of an isoindoline derivative of the general formula:

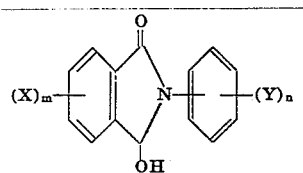

III wherein the various symbols are as hereinbefore defined. The reaction is generally carried out in an anhydrous inert organic solvent, for example dimethylformamide, at a temperature below 50°C.

The isoindoline derivatives of general formula III can be obtained by partial reduction of a phthalimide of the general formula:

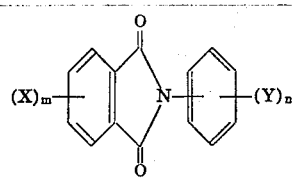

IV wherein the various symbols are as hereinbefore defined. The reduction is generally carried out by means of an alkali metal borohydride in aqueous-alcoholic solution, or by means of magnesium in a mixture of methanol and a saturated solution of ammonium chloride.

When the phthalimido radical is unsymmetrically substituted, the partial reduction of a compound of general formula IV can yield isomeric products, which can be separated by physico-chemical methods such as fractional crystallisation or chromatography.

The phthalimide derivatives of general formula IV can be obtained by reaction of an aniline of the general formula:

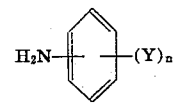

V (wherein Y and $n$ are as hereinbefore defined) with a phthalic anhydride of the general formula:

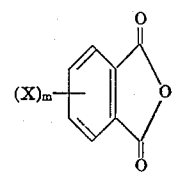

VI wherein X and $m$ are as hereinbefore defined.

According to another feature of the invention, the isoindoline derivatives of general formula I are prepared by the process which comprises reacting an amine of the general formula:

VII (wherein $R_1$ and $R_2$ are as hereinbefore defined) with a mixed carbonate of the general formula:

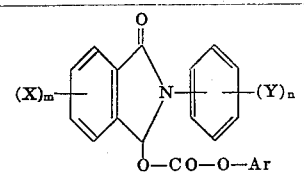

VIII wherein Ar represents a phenyl radical optionally substituted by, for example, an alkyl radical containing 1 to 4 carbon atoms, and the other symbols are as hereinbefore defined. The reaction is generally carried out in an inert organic solvent, for example acetonitrile, and at a temperature of 15° to 25°C.

The mixed carbonates of the general formula VIII can be prepared by reaction of a chloroformate of the general formula:

$$Cl - CO - OAr \qquad IX$$

(wherein Ar is as hereinbefore defined) with an isoindoline derivative of general formula III. The reaction is generally carried out in a basic organic solvent, for example, pyridine, and at a temperature below 10°C.

The isoindoline derivatives of general formula I obtained by the aforementioned processes can be purified by physical methods such as distillation, crystallisation or chromatography, or by chemical methods such as the formation of salts, crystallisation of the salts and decomposition of them in an alkaline medium. In carrying out the said chemical methods the nature of the anion of the salt is immaterial, the only requirement being that the salt must be well-defined and readily crystallisable.

The isoindoline derivatives of general formula I may be converted by methods known per se into acid addition salts. The acid addition salts may be obtained by the action of acids on the isoindoline derivatives in appropriate solvents. As organic solvents there may be used alcohols, ethers, ketones or chlorinated hydrocarbons. The salt which is formed is precipitated, if necessary after concentration of the solution, and is isolated by filtration or decantation.

The isoindoline derivatives of the invention and their acid addition salts possess valuable pharmacological properties; they are particularly active as tranquillisers and anti-convulsant agents. In animals (mice) they have proved active as such at doses of between 10 and 100 mg./kg. animal body weight when administered orally, in particular in the following tests:

i. electric battle test according to a technique similar to that of Tedeschi et al. [J. Pharmacol., 125, 28 (1959)], ii. convulsion with pentetrazole according to a technique similar to that of Everett and Richards [J. Pharmacol., 81, 402 (1944)], iii. supramaximal electroshock according to the technique of Swinyard et al. [J. Pharmacol., 106, 319 (1952)], and iv. locomotor activity according to the technique of Courvoisier [Congrès des Médecins Aliénistes et Neurologistes— Tours — (8/13th June 1959)].

Preferred isoindoline derivatives of the invention are those of general formula I in which $m$ represents zero, Y is as hereinbefore defined, $n$ represents zero or 1, and $R_1$ and $R_2$ together with the nitrogen atom to which they are attached collectively represent a 4-alkylpiperazin-1-yl group, and more particularly those such compounds in which Y represents a halogen (e.g. chlorine or fluorine) atom or a nitro or cyano radical, $n$ represents 1, and the grouping $-NR_1R_2$ represents 4-methylpiperazin-1-yl.

For therapeutic purposes, the isoindoline derivatives of general formula I may be employed as such or in the form of non-toxic acid addition salts, i.e. salts containing anions which are relatively innocuous to the animal organism in therapeutic doses of the salts (such as hydrochlorides, sulphates, nitrates, phosphates, acetates, propionates, succinates, benzoates, fumarates, maleates, tartrates, theophyllinacetates, salicylates, phenolphthalinates and methylene-bis-β-hydroxynaphthoates) so that the beneficial physiological properties inherent in the bases are not vitiated by side-effects ascribable to the anions.

The following examples illustrate the invention.

EXAMPLE 1

A solution of 3-hydroxy-2-phenyl-isoindolin-1-one (12.8 g.) in anhydrous dimethylformamide (50 cc.) is added to a suspension of sodium hydride (54 percent dispersion in mineral oil) (2.8 g.) in anhydrous dimethylformamide (30 cc.) over the course of 20 minutes, whilst keeping the temperature at about 25°C. When the evolution of gas has ceased, 1-chlorocarbonyl-4-methylpiperazine (9.3 g.) is added slowly whilst keeping the temperature at between 25 and 35°C. The reaction mixture is stirred for a further 2 hours at a temperature of about 20°C. and is then poured into ice-water (1000 cc.). After adding chloroform (200 cc.) to dissolve the gum which has appeared, the organic layer is separated and the aqueous phase is extracted with chloroform (2 × 100 cc.). Th organic fractions are combined, washed with an aqueous sodium chloride solution (containing 250 g./litre) (100 cc.) and dried over anhydrous sodium sulphate (50 g.). After filtration and concentration under reduced pressure, a yellow oil is obtained which on trituration with diisopropyl ether (50 cc.) yields a solid product (13.8 g.). Recrystallisation from ethanol (60 cc.) yields 2-phenyl-3-(4-methylpiperazin-1-Yl)carbonyloxy-isoindolin-1-one (12.4 g.) melting at 149°C.

3-Hydroxy-2-phenyl-isoindolin-1-one can be prepared in accordance with the method described by A. Dunet and A. Willemart, Bull. Soc. Chim., 1045 (1948).

EXAMPLE 2

A solution of 2-(3-chlorophenyl)-3-hydroxyisoindolin-1-one (11.4 g.) in anhydrous dimethylformamide (80 cc.) is added slowly to a suspension of sodium hydride (50 percent dispersion in mineral oil) (2.4 g.) in anhydrous dimethylformamide (80 cc.), whilst keeping the temperature at about 25°C. When the evolution of gas has ceased, a solution of 1-chlorocarbonyl-4-methylpiperazine (8.2 g.) in anhydrous dimethylformamide (15 cc.) is added slowly whilst keeping the temperature at about 27°C. The reaction mixture is stirred for a further hour after the end of the addition and is then poured into ice-water (800 cc.). The resinous product which separates is extracted with diethyl ehter (1000 cc.) and the ether solution is then washed with water (450 cc.) and dried over sodium sulphate in the presence of decolourizing charcoal. After filtration, the ether is distilled off under reduced pressure and a product (13.5 g.), melting at 115°C., is obtained. Recrystallization from diisopropyl ether (500 cc.) yields 2-(3-chlorophenyl)-3-(4-methylpiperazin-1-yl)carbonyloxy-isoindolin-1-one (10 g.) melting at 121°C.

2-(3-Chlorophenyl)-3-hydroxy-isoindolin-1-one can be prepared by adding a saturated aqueous solution of ammonium chloride (150 cc.) to a suspension of 2-(3-chlorophenyl)phthalimide (25.75 g.) and magnesium turnings (8.8 g.) in methanol (1000 cc.). After heating under reflux for 2 hours and stirring at 20°C. for 20 hours, decolourizing charcoal (10 g.) is added, the mixture is filtered and the methanol is then distilled off under reduced pressure. Water (500 cc.) is then added to the residue. The product which crystallizes is filtered off and washed with water (200 cc.). After drying, a product (18.9 g.), melting at 170°C., is obtained. Recrystallization from ethanol (200 cc.) yields 2-(3-chlorophenyl)-3-hydroxy-isoindolin-1-one (11.5 g.) melting at 172°C.

2-(3-Chlorophenyl)phthalimide can be prepared in accordance with the melted described by G. Pagani et al., Il Farmaco Ed. Sc., 23 [5], 448 (1968).

EXAMPLE 3

A solution of 2-(4-chlorophenyl)-3-hydroxy-isoinodlin-1-one (13 g.) in anhydrous dimethylformamide (100 cc.) is added slowly to a suspension of sodium hydride (50 percent dispersion in mineral oil) (2.7 g.) in anhydrous dimethylformamide (100 cc.) whilst keeping the temperature at about 25°C. When the evolution of gas has ceased, a solution of 1-chlorocarbonyl-4-methylpiperazine (9.1 g.) in anhydrous dimethylformamide (20 cc.) is added slowly whilst keeping the temperature at about 30°C. The reaction mixture is stirred for a further hour after the completion of the addition and is then poured into ice-water (1000 cc.). The product which crystallizes is filtered off and washed with water (300 cc.). After drying, a product (19.3 g.), melting at 154–156°C., is obtained. Recrystallization from ethanol (200 cc.) yields 2-(4-chlorophenyl)-3-(4-methylpiperazin-1-yl)carbonyloxy-isoindolin-1-one (15.4 g.) melting at 156°C.

2-(4-Chlorophenyl)-3-hydroxy-isoindolin-1-one can be prepared by adding a saturated aqueous ammonium chloride solution (150 cc.) to a suspension of 2-(4-chlorophenyl)-phthalimide (25.75 g.) and magnesium turnings (8.8 g.) in methanol (1000 cc.). After heating under reflux for 2 hours and then stirring at 20°C. for 20 hours, the reaction mixture is again heated to the boiling point, decolourizing charcoal (10 g.) is then added and the mixture is filtered hot. After evaporation of the methanol under reduced pressure, water (500 cc.) is added to the residue. A product crystallizes and is filtered off and washed with water (200 cc.). After drying, a product (21.8 g.), melting at 200°C., is obtained. Recrystallization from ethanol (350 cc.) yields 2-(4-chlorophenyl)-3-hydroxy-isoindolin-1-one (14.6 g.) melting at 200°C.

2-(4-Chlorophenyl)phthalimide can be prepared in accordance with the method described by G. Pagani et al., Il Farmaco Ed. Sc., 23 [5], 448 (1968).

EXAMPLE 4

A solution of 2-(2-chlorophenyl)-3-hydroxy-isoindolin-1-one (13 g.) in anhydrous dimethylformamide (100 cc.) is added slowly to a suspension of sodium hydride (50 percent dispersion in mineral oil) (2.7 g.) in anhydrous dimethylformamide (100 cc.), whilst keeping the temperature at about 25°C. When the evolution of gas has ceased, a solution of 1-chlorocarbonyl-4-methylpiperazine (9.1 g.) in anhydrous dimethylformamide (20 cc.) is added slowly whilst keeping the temperature at about 30°C. The reaction mixture is stirred for a further hour after the end of the addition and is then poured into ice-water (1000 cc.). The oily product which has appeared is extracted with chloroform (1000 cc.) and the chloroform solution is then washed with water (200 cc.) and dried over sodium sulphate. After filtration, the chloroform solution is concentrated under reduced pressure to a volume of 150 cc. and is then filtered over silica gel (100 g.) contained in a column of 3cm. in diameter. The column is firstly eluted with chloroform (200 cc.) and the eluate discarded, them with more chloroform (1,300 cc.) and finally with ethyl acetate (1000 cc.). The solutions obtained are combined and concentrated to dryness under reduced pressure. A mixture of an oil and of crystals is obtained, and the latter are filtered off.

On recrystallization of the crystalline product from diisopropyl ether (400 cc.) and removal at the boiling point of a slight amount of insoluble matter, 2-(2-chlorophenyl)-3-(4-methylpiperazin-1-yl)carbonyloxy-isoindolin-1-one (8.1 g.), melting at 106°C., is obtained.

2-(2-Chlorophenyl)-3-hydroxy-isoindolin-1-one can be prepared by adding a saturated aqueous ammonium chloride solution (150 cc.) to a suspension of 2-(2-chlorophenyl)-phthalimide (25.75 g.) and magnesium turnings (8.8 g.) in methanol (1000 cc.). After heating under reflux for 2 hours and then stirring at 20°C. for 18 hours, decolourizing charcoal (10 g.) is added, the mixture is filtered and the methanol is then distilled under reduced pressure. Water (500 cc.) is added to the residue and the product which crystallizes is filtered off and washed with water (200 cc.). After drying, a product (22.7 g.) melting at 169°C. is obtained. Recrystallization from ethanol (100 cc.) yields 2-(2-chlorophenyl)-3-hydroxy-isoindolin-1-one (18.5 g.) melting at 173°C.

2-(2-Chlorophenyl)phthalimide can be prepared in accordance with the method described by G. Pagani et al., Il Farmaco Ed. Sc., 23 [5], 448 (1968).

EXAMPLE 5

A solution of 3-hydroxy-2-(3-methyphenyl)-isoindolin-1-one (13.2 g.) in anhydrous dimethylformamide (90 cc.) is added to a suspension of sodium hydride (50 percent dispersion in mineral oil) (3 g.) in anhydrous dimethylformamide (60 cc.), kept at 20°C., over the course of 13 minutes. When the evolution of gas has ceased, 1-chlorocarbonyl-4-methylpiperazine (9 g.) followed by anhydrous dimethylformamide (50 cc.) are added at 25°C. The mixture is stirred for a further 2 hours at 25°C. and is then poured into ice-water (700 cc.) and methylene chloride (200 cc.). The organic phase is separated, and the aqueous phase is extracted with methylene chloride (2 × 80 cc.).

The combined organic phases are dried over sodium sulphate. After filtration, the solvent is evaporated under reduced pressure (30 mm. Hg.). The residue is dissolved in diisopropyl ether (150 cc.). A product crystallizes, which is filtered off and washed with diisopropyl ether (2 × 20 cc.). 2-(3-Methylphenyl)-3-(4-methylpiperazin-1-yl)carbonyloxy-isoindolin-1-one (13.7 g.), melting at 127 –128°C., is thus obtained.

3-Hydroxy-2-(3-methylphenyl)-isoindolin-1-one can be prepared by heating at 68°C. for 2 hours a suspension of 2-(3-methylphenyl)phthalimide (28.5 g.) and magnesium turnings (10.5 g.) in methanol (1200 cc.) and an aqueous solution which has been saturated with ammonium chloride at 20°C. (180 cc.).

Thereafter the cloudy solution thus obtained is filtered and concentrated under reduced pressure whilst heating at 50°C. The gummy residue is taken up in distilled water (500 cc.). A product crystallizes and is filtered off, washed with distilled water (3 × 100 cc.) and dried under reduced pressure (30 mm. Hg.). 3-

Hydroxy-2-(3-methylphenyl)-isoindolin-1-one (25.7 g.), melting at 138°C., is thus obtained.

2-(3-Methylphenyl)phthalimide can be prepared according to K. Kjeldgaard, Arznei. Forsch. 12, 1207 (1962).

EXAMPLE 6

A solution of 3-hydroxy-2-(3-methoxyphenyl)-isoindolin-1-one (12.7 g.) in anhydrous dimethylformamide (60 cc.) is added over the course of 20 minutes to a suspension of sodium hydride (50 percent dispersion in mineral oil) (2.64 g.) in anhydrous dimethylformamide (60 cc.), kept at 20–25°C. When the evolution of gas has ceased, 1-chlorocarbonyl-4-methylpiperazine (8.2 g.) in anhydrous dimethylformamide (30 cc.) is added at 35°C. The mixture is stirred for a further 2 hours at 20°C. and is then poured into ice-water (450 cc.) and methylene chloride (200 cc.). The organic phase is separated, and the aqueous phase is extracted with methylene chloride (2 × 50 cc.). The combined organic phase are washed with distilled water (3 × 50 cc.) and then dried over sodium sulphate. After filtration, the solvent is evaporated under reduced pressure. The crystalline residue (24.7 g.) is taken up in diisopropyl ether (75 cc.). The crystals are filtered off and washed with diisopropyl ether (2 × 15 cc.). 2-(3-Methoxyphenyl)-3-(4-methylpiperazin-1-yl)carbonyloxy-isoindolin-1-one (15.6 g.), melting at 153°C., is thus obtained.

3-Hydroxy-2-(3-methoxyphenyl)isoindolin-1-one can be prepared by heating at 67°C. for 2 hours a suspension of 2-(3-methoxyphenyl)phthalimide (15.2 g.) and magnesium turnings (5.3 g.) in methanol (600 cc.) and an aqueous solution saturated with ammonium chloride at 20°C. (90 cc.). The cloudy solution thus obtained is then filtered and concentrated under reduced pressure whilst heating at 60°C. The gummy residue is taken up in distilled water (60 cc.). A product crystallizes and is filtered off, washed with water (2 × 30 cc.) and then with diisopropyl ether (2 × 30 cc.) and dried under reduced pressure (30 mm. Hg.). 3-Hydroxy-2-(3-methoxyphenyl)isoindolin-1-one (13.4 g.), melting at 129–130°C. is thus obtained.

2-(3-Methoxyphenyl)phthalimide can be prepared in accordance with G. Vanags and A. Veinbergs, Ber., 75 B, 1558 (1942).

EXAMPLE 7

A solution of 3-hydroxy-2-(3-nitrophenyl)-isoindolin-1-one (18.7 g.) in anhydrous dimethylformamide (240 cc.) is added over the course of 20 minutes to a suspension of sodium hydride (54 percent dispersion in mineral oil) (2.9 g.) in anhydrous dimethylformamide (25 cc.), whilst keeping the temperature at about 25°C. When the evolution of gas has ceased, 1-chlorocarbonyl-4-methylpiperazine (9.9 g.) is added over the course of 10 minutes whilst keeping the temperature at 25°C. The reaction mixture is stirred for a further 4 hours at a temperature of about 20°C. and is then poured into ice-water (1800 cc.). The crystals which have appeared are filtered off. A product (17.9 g.) melting at about 150–155°C., is thus obtained.

This product is dissolved in methylene chloride (250 cc.) and the solution obtained is filtered over silica gel (450 g.) contained in a column 5.4 cm. in diameter. The column is thereafter eluted with an ethyl acetate-methylene chloride mixture (1-1 by volume; 1000 cc.), pure ethyl acetate (2000 cc.) and then an ethyl acetate-methanol mixture (9-1 by volume; 1000 cc.). These various eluates are discarded. Thereafter the column is eluted with an ethyl acetate-methanol mixture (8-2 by volume; 1000 cc.) and an ethyl acetate-methanol mixture (6-4 by volume; 1000 cc.). The latter two eluates are combined and concentrated to dryness under reduced pressure. A product (13.3 g.) melting at 169°C. is thus obtained. Recrystallization from ethanol (360 cc.) yields 2-(3-nitrophenyl)-3-(4-methylpiperazin-1-yl)-carbonyloxy-isoindolin-1-one (12.6 g.) melting at 171°C.

3-Hydroxy-2-(3-nitrophenyl)-isoindolin-1-one can be prepared by adding a solution of potassium borohydride (25 g.) in distilled water (250 cc.) and N sodium hydroxide solution (25 cc.) to a suspension of 2-(3-nitrophenyl)-phthalimide (166.5 g.) in methanol (830 cc.) over the course of 40 minutes whilst stirring and keeping the temperature at 15°C. After 20 hours at a temperature of about 20°C., the crystals which have appeared are filtered off and dried. 3-Hydroxy-2-(3-nitrophenyl)-isoindolin-1-one (148 g.), melting at 220–222°C., is thus obtained.

2-(3-Nitrophenyl)phthalimide can be prepared in accordance with A. Arcoria, J. Barassin and H. Lumbroso, Bull. Soc. Chim. 2509 (1963).

EXAMPLE 8

A solution of 3-hydroxy-2-(4-nitrophenyl)-isoindolin-1-one (15 g.) in anhydrous dimethylformamide (240 cc.) is added over the course of 20 minutes to a suspension of sodium hydride (54 percent dispersion in mineral oil) (2.9 g.) in anhydrous dimethylformamide (25 cc.), whilst keeping the temperature at about 25°C. When the evolution of gas has ceased, 1-chlorocarbonyl-4-methylpiperazine (9.9 g.) is added slowly whilst keeping the temperature at 25°C. The reaction mixture is stirred for a further 4 hours at a temperature of about 20°C. and is then poured into ice-water (1800 cc.). The crystals which have appeared are filtered off. A product (16.4 g.) melting at 195°C. is thus obtained.

The product is dissolved in methylene chloride (500 cc.). After removing an insoluble material (3.2 g.) by filtration, the filtrate is concentrated to volume of about 150 cc. The solution thus obtained is then filtered over silica gel (410 g.) contained in a column 5.4 cm. in diameter. The column is thereafter eluted with an ethyl acetate-methylene chloride mixture (1-1 by volume; 1000 cc.), ethyl acetate (1000 cc.) and then an ethyl acetate-methanol mixture (9-1 by volume; 1000 cc.). These various eluates are discarded. Thereafter the column is eluted with an ethyl acetate-methanol mixture (8-2 by volume; 1000 cc.). This eluate is concentrated to dryness under reduced pressure. A product (8.7 g.) melting at 202°C. is thus obtained. Recrystallisation from acetonitrile (345 cc.) yields 2-(4-nitrophenyl)-3-(4-methypiperazin-1-yl)carbonyloxy-isoindolin-1-one (7.9 g.) melting at 202°C.

3-Hydroxy-2-(4-nitrophenyl)isoindolin-1-one can be prepared in accordance with Zen-Ichi Horii et al., J. Org. Chem., 26, 2273 (1961).

EXAMPLE 9

A solution of 2-(3-cyanophenyl)-3-hydroxy-isoindolin-1-one (18 g.) in anhydrous dimethylformamide (110 cc.) is added slowly to a suspension of sodium hydride (50 percent dispersion in mineral oil) (3.77 g.) in anhydrous dimethylformamide (100 cc.), whilst keeping the temperature at about 25°C. When the evolution of gas has ceased, a solution of 1-chloro-carbonyl-4-methylpiperazine (12 g.) in anhydrous dimethylformamide (30 cc.) is added slowly whilst allowing the temperature to rise to about 38°C. The reaction mixture is stirred for a further two hours after the end of the addition and is then poured into ice-water (600 cc.). The product which separates is extracted with chloroform (500 cc.) and the chloroform solution is then washed with distilled water (3 × 100 cc.) and dried over sodium sulphate in the presence of decolourizing charcoal. After filtration, the chloroform is distilled under reduced pressure and the oil obtained (31 g.) is taken up in diisopropyl ether (100 cc.). The product which crystallizes is filtered off and then washed with diisopropyl ether (2 × 20 cc.). After drying, 2-(3-cyanophenyl)-3-(4-methylpiperazin-1-yl)carbonyloxy-isoindolin-1-one (23.9 g.), melting at 176°C., is obtained.

2-(3-Cyanophenyl)-3-hydroxy-isoindolin-1-one can be prepared by adding a solution of potassium borohydride (3.5 g.) in distilled water (30 cc.) and N sodium hydroxide solution (3.6 cc.) to a suspension of 2-(3-cyanophenyl)-phthalimide (22 g.) in methanol (200 cc.), whilst stirring and keeping the temperature at 15°C. After 20 hours at a temperature of about 20°C., the crystals which have appeared are filtered off and dried. 2-(3-Cyanophenyl)-3-hydroxy-isoindolin-1-one (18 g.), melting at 192°C., is thus obtained.

2-(3-Cyanophenyl)phthalimide can be prepared by heating a mixture of m-amino-benzonitrile (15.6 g.) and phthalic anhydride (19.6 g.) in acetic acid (200 cc.) for 3 hours at 117°C. The solution obtained is poured into a mixture of water (200 g.) and ice (400 g.); a solid crystallizes and is filtered off. After recrystallization from acetonitrile (250 cc.), 2-(3-cyanophenyl)phthalimide (26 g.) melting at 190°C., is obtained.

EXAMPLE 10

A solution of 2-(3-fluorophenyl)-3-hydroxy-isoindolin-1-one (16.3 g.) in anhydrous dimethylformamide (90 cc.) is added slowly to a suspension of sodium hydride (50 percent dispersion in mineral oil) (3.5 g.) in anhydrous dimethyl-formamide (80 cc.), whilst keeping the temperature at about 20°C. When the evolution of gas has ceased, a solution of 1-chlorocarbonyl-4-methylpiperazine (11.4 g.) in anhydrous dimethylformamide (20 cc.) is added slowly whilst allowing the temperature to rise to about 39°C. The reaction mixture is stirred for a further 2 hours after the end of the addition and is then poured into water (480 cc.). The product which separates is extracted with chloroform (340 cc.) and the chloroform solution is then washed with distilled water (3 × 50 cc.) and dried over sodium sulphate in the presence of decolourizing charcoal. After filtration, the chloroform is distilled under reduced pressure and the oil obtained (30.4 g.) is taken up in diisopropyl ether (100 cc.). The product which crystallizes is filtered off and then washed with diethyl ether (3 × 20 cc.). After drying, 2-(3-fluorophenyl)-3-(4-methylpiperazin-1-yl)carbonyloxy-isoindolin-1-one (22.4 g.), melting at 155°C., is obtained.

2-(3-Fluorophenyl)-3-hydroxy-isoindolin-1-one can be prepared by adding a solution of potassium borohydride (3.7 g.) in distilled water (35 cc.) and N sodium hydroxide solution (3.7 cc.) to a suspension of 2-(3-fluorophenyl)-phthalimide (22 g.) in methanol (120 cc.), whilst stirring and keeping the temperature at 17°C. The mixture is stirred for a further 4 hours at 23°C. and is then left for 16 hours at a temperature of about 20°C.; the crystals which have appeared are filtered off and dried. 2-(3-Fluorophenyl)-3-hydroxy-isoindolin-1-one (16.5.g.), melting at 161°C., is thus obtained.

2-(3-Fluorophenyl)phthalimide can be prepared in accordance with the method described by G. Pagani et al., Il Farmaco Ed. Sc., 23 [5], 448 (1968).

The present invention includes within its scope pharmaceutical compositions comprising, as active ingredient, at least one of the isoindoline derivatives of general formula I, or a non-toxic acid addition salt thereof, in association with a pharmaceutical carrier or coating. The invention includes especially such preparations made up for oral, parenteral or rectal administration or local application, e.g. as ointments.

Solid compositions for oral administration include tablets, pills, powders and granules. In such solid compositions the active compound is admixed with at least one inert diluent such as sucrose, lactose or starch. The compositions may also comprise, as is normal practice, additional substances other than inert diluents, e.g. lubricating agents, such as magnesium stearate. Liquid compositions for oral administration include pharmaceutically-acceptable emulsions, solutions, suspensions, syrups and elixirs containing insert diluents commonly used in the art, such as water and liquid paraffin. Besides inert diluents such compositions may also comprise adjuvants, such as wetting, emulsifying and suspending agents, and sweetening, flavouring and aromatizing agents. The compositions according to the invention, for oral administration, also include capsules of absorbable material such as gelatin containing the active substance with or without the addition of diluents or excipients.

Preparations according to the invention for parenteral administration include sterile aqueous or non-aqueous solutions, suspensions or emulsions. Examples of non-aqueous solvents or vehicles are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilized by, for example, filtration through a bacteria-retaining filter, by incorporation in the compositions of sterilizing agents, by irradiation, or by heating. They may also be manufactured in the form of sterile solid compositions, which can be dissolved in sterile water or some other sterile injectable medium immediately before use.

Compositions for rectal administration are suppositories which contain, in addition to the active substance, excipients such as cacao butter or a suitable wax base.

The percentage of active ingredient in the compositions of the invention may be varied, it being necessary that it should constitute a proportion such that a suitable dosage shall be obtained. The dosage depends on the desired therapeutic effect, on the route of administration and on the duration of the treatment. In human therapy the compositions when administered orally to an adult should generally give doses between 50 mg. and 500 mg. of active substance per day. In general the physician will decide the posology considered appropriate, taking into account the age and weight and other factors intrinsic to the patient being treated.

The following example illustrates pharmaceutical compositions according to the invention.

EXAMPLE 11

Tablets containing 25 mg. of active product and having the following composition are prepared in accordance with the usual technique:

| | |
|---|---|
| 2-(3-nitrophenyl)-3-(4-methylpiperazin-1-yl)-carbonyloxy-isoindolin-1-one | 0.025 g. |
| starch | 0.090 g. |
| precipitated silica | 0.030 g. |
| magnesium stearate | 0.005 g. |

We claim:
1. An isoindoline derivative of the formula:

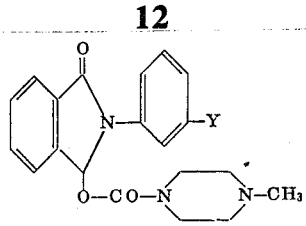

wherein Y is halogen, nitro, or cyano, and pharmaceutically acceptable non-toxic acid addition salts thereof.

2. The isoindoline compound according to claim 1 which is 2-(3-chlorophenyl)-3-(4-methylpiperazin-1-yl)-carbonyloxy-isoindolin-1-one and pharmaceutically acceptable non-toxic acid addition salts thereof.

3. The isoindoline compound according to claim 1 which is 2-(3-nitrophenyl)-3-(4-methylpiperazin-1-yl)-carbonyloxy-isoindolin-1-one and pharmaceutically acceptable non-toxic acid addition salts thereof.

4. The isoindoline compound according to claim 1 which is 2-(3-cyanophenyl)-3-(4-methylpiperazin-1-yl)-carbonyloxy-isoindolin-1-one and pharmaceutically acceptable non-toxic acid addition salts thereof.

5. The isoindoline compound according to claim 1 which is 2-(3-fluorophenyl)-3-(4-methylpiperazin-1-yl)-carbonyloxy-isoindolin-1-one and pharmaceutically acceptable non-toxic acid addition salts thereof.

* * * * *